Patented Sept. 30, 1952

2,612,514

UNITED STATES PATENT OFFICE 2,612,514

PRODUCTION OF ESTERS OF RELATIVELY STRONG ORGANIC AND INORGANIC ACIDS WITH ALIPHATIC COMPOUNDS HAVING MORE THAN ONE CARBON ATOM

Edwin P. Plueddemann, Toledo, Ohio, assignor to Food Machinery and Chemical Corporation, Wilmington, Del., a corporation of Delaware No Drawing. Application June 4, 1947, Serial No. 752,557

16 Claims. (Cl. 260—461)

This invention relates to methods of producing higher organic esters of relatively strong acids and to certain esters producible by said methods as new compounds. More particularly the process basically involves the reaction of higher organic halides with methyl esters of relatively strong acids in the presence of an amine catalyst in which reaction methyl halide is liberated and the higher organic radicals replace the methyl groups forming new or different esters. As new compounds, there may be mentioned tri-chlorobutenyl phosphate and tri-chloropropenyl phosphate.

Neutral esters of strong mineral acids such as phosphoric and sulfuric have heretofore been prepared (1) by reacting the acid chloride with alcohols, removing HCl by suitable means and recovering the ester or (2) by reacting an alkyl halide with the salt formed from a heavy or active metal such as silver, yielding the ester and silver halide as a by-product, or (3) by special methods of limited applicability. Direct esterification of the acid with alcohols or "ester exchange" reactions of an available ester with another alcohol have not been successfully applied in the preparation of these esters. The use of silver or other heavy metal salts is too costly to be of commercial value.

Esterification with certain alcohols may also be impractical because of the high cost of the alcohols or because of the difficulty of controlling certain alcohol esterifications. Allylic alcohols such as allyl, methallyl, benzyl, 3-chloro-2-propenyl, and 3-chloro-2-butenyl alcohols are more expensive than the corresponding halides, and great difficulty is encountered in preparing strong acid esters of these alcohols by any method generally used.

Certain of these esters have been recommended as monomers for copolymerization with other materials in the preparation of plastic masses, or as high boiling plasticizers, but have not come into prominence because they have not been readily available by known methods of preparation.

Accordingly an object of the present invention is to provide a commercially acceptable method of producing known esters suitable for use in the above-mentioned and other fields. Another object is to provide new esters which, because of their low volatility, good compatibility and pronounced fire resistance, have value as solvents and plasticizers for plastic masses, coatings and the like. As to all of the esters, it is an object to provide processes whereby they may be prepared in good yields from readily available materials.

Broadly considered, the process of the present invention involves mixing a higher organic chloride, such as benzyl chloride, with a methyl ester of a relatively strong acid such as trimethyl phosphate, and with a catalytic or small amount of an amine, and heating the resulting mixture at an elevated temperature until methyl halide is liberated and a higher organic ester of the acid, as tribenzyl phosphate, is obtained. The methyl chloride is preferably allowed to escape as it forms and is led through a condensing chamber to storage. The higher ester may then be recovered in purified form from the residual reaction mass by distillation or crystallization or by any other suitable method.

The catalytic nature of the process is conclusively revealed by heating trimethyl phosphate or other methyl ester with a reactive chloride such as benzyl chloride to a temperature in excess of 150° C. first in the absence of an amine, and second, in the presence of an amine. In the first instance no appreciable reaction occurs, but when a small amount of tributyl amine or other amine is added, a vigorous reaction occurs resulting in the rapid evolution of methyl chloride and the displacement of the methyl radicals of the phosphate by the benzyl radicals.

The reaction is preferably carried out in the presence of an addition of a small amount of potassuim carbonate, soda ash or other anhydrous base which combines with any acid liberated by side reactions during the period of heating. Yields are substantially improved through this procedure.

During the heating operation, the temperature rises to a point above 100° C. where any moisture present is vaporized off and reaction commences to occur. The optimum reaction temperature varies according to the strength or ionization constant of the acid, and according to the reactivity of the particular organic chloride selected, but temperatures between 120° and 170° C. have generally been found most satisfactory. Lower temperatures, however, may be used with various more reactive mixtures and higher temperatures may be required with less reactive mixtures. Temperatures above 200° C. or higher cannot ordinarily be employed because at such levels, decomposition and side reactions are likely to occur.

The nature of the catalytic action has not been definitely determined but it appears that the amine catalyst acts through an intermediate quaternary ammonium compound formed by its reaction with the higher organic chloride. This explanation of the reaction is indicated inasmuch as quaternary ammonium compounds such as trimethyl benzyl ammonium chloride have a catalytic activity equal to that of free tertiary amines. It is recognized as possible, however, that the amine catalyst might react first with the methyl ester to cause dissociation of the acyl ion and the tetraalkylammonium ion.

In certain instances equimolar quantities of tertiary amine may first be warmed with the alkyl halide to form a quaternary ammonium salt which may then be heated with a methyl ester to liberate methyl halide and form the alkyl ester. Such a procedure may be especially helpful in the preparation of esters from low boiling halides such as allyl chloride or bromide which do not react with methyl esters at their reflux temperatures.

The chlorides, bromides and iodides of the various types of organic compounds hereinafter disclosed contain more than one carbon atom, the preferred examples being octyl chloride and benzyl chloride in which the chlorine atoms are joined to aliphatic radicals. Although the iodides and bromides sometimes react more readily, the chlorides are preferred in view of their availability and cheapness. Organic halides of any high molecular weight may be employed so long as they will react with tertiary amines to form quaternary ammonium salts. Organic halides of eighteen carbon atoms react just as effectively as those of eight carbon atoms.

The organic component of the halide may be aliphatic, or it may be cycloaliphatic or hydroaromatic, or aromatic-aliphatic, the halogen atom in each case preferably being joined to the aliphatic radical thereof, the said compounds being hereinafter referred to generically as "aliphatic halide compounds." It may be a pure primary or secondary normal, or branched chain alkyl chloride or other chloride, a mixture of pure primary and secondary chlorides, a mixed primary-secondary dichloride, a mixture of chlorides such as those obtained by chlorinating a hydrocarbon fraction, or a long chain polyhalide such as a polyvinyl chloride.

The organic radical of the halide may be either saturated or unsaturated and substituted or unsubstituted. As to substitution groups there may be mentioned the carbonyl or ester group, ether linkages and nitro groups. In some instances the substituent on the hydrocarbon radical is inert or non-functional and in others it assists in the process due to its effect in activating the chloride. In all instances, the substituent is less active than the halogen atom in that the former does not separate off from the hydrocarbon radical as does the latter.

As examples of suitable chlorides or other halides there may be mentioned butyl, allyl, benzyl, octyl and methallyl chlorides, also chlorinated ketones, acids, esters, ethers, nitro paraffins, 1,3-dichlor-2-butene, 1,3-dichlorohexadiene-2,4 and other chloro-olefins. When dichloro-olefin esters such as the above are employed in the reaction, only the allylic chlorine enters into the reaction and as a result "chloro-ene" esters are obtained.

An excess of the organic halide is generally used in order to obtain maximum utilization of the methyl esters and to shorten the reaction time. A 100% excess of organic halide has been observed to give good over-all efficiency, but a much larger excess may be used without penalty except for the decreased yield per volume of reactor space and the additional processing required to recover the added excess. At the other extreme, an excess of methyl ester may also be used to obtain maximum reaction of the halide. Any unreacted methyl esters may then be recovered and recycled.

The methyl esters employed in the processes of the present invention hereinbefore described as methyl esters of relatively strong acids, include derivatives of those organic and inorganic acids which are commonly referred to as being strong and moderately strong acids. Among the acids whose methyl esters have been tested and found satisfactory there may be mentioned in particular, phosphoric, alkyl phosphoric, sulphuric, sulfonic, oxalic, maleic, phosphorous, and phosphonic acids, which may be referred to generally as oxygen-containing acids. These acids in one embodiment of the invention are employed in the form of their simple esters, examples of the same being dimethyloxalate, trimethyl phosphate and dimethyl sulfate. In an alternative embodiment, such acids are employed in the form of their mixed esters containing in addition to one or more methyl groups, one or more higher organic radicals, and when such esters are used they react exclusively at the methyl ester linkage or linkages. Thus, if a mixed methyl alkyl phosphate is reacted with an alkyl chloride, the alkyl radical of the chloride replaces only the methyl group or groups of the mixed phosphate. The alkyl group of the chloride is selected such that it is identical with the alkyl group of the phosphate employed if it is desired to produce a simple trialkyl phosphate. Mixed trialkyl phosphates can be produced by selecting an alkyl chloride of a different alkyl radical than that of the methyl alkyl phosphate used.

In place of the simple or mixed esters, the present invention in another embodiment contemplates employing alkali metal salts of methyl acid esters of polybasic acids, as for example the sodium and potassium salts of methyl acid phosphates. If methyl dipotassium phosphate is reacted with an alkyl chloride in the absence of an amine catalyst, a mixed methyl dialkyl phosphate is obtained and if the said mixed phosphate is then reacted with the same or a different alkyl chloride in the presence of an amine catalyst, in accordance with the present invention, higher simple or mixed alkyl phosphates free of methyl groups are obtained. If the catalyst is included initially, the methyl potassium phosphate reacts with the alkyl chloride by a simultaneous esterification and replacement to form trialkyl phosphate free of methyl groups in one operation.

Comparison of the acids found operable in the present invention with those found inoperable indicates that there is a close analogy between the ionization constant of each acid and the reactivity of its methyl ester in the process of the present invention. From these results it appears that the methyl ester of only those acids having an ionization constant of more than $1.0 \times 10^{-4}$ may be used in the present process to provide economic yields of the desired esters.

The particular temperature required for optimum results depends upon the reactivity of the methyl esters as well as of the organic halide employed. Esters of stronger acids such as di- and tri-chloroacetic, maleic, oxalic and the strong mineral acids do not require as high a temperature as the esters of the less strong acids, monochloroacetic acid, other haloaliphatic acids, ortho substituted benzoic acids and dimethyl phthalate.

With reference to the catalysts employed, amines as a class appear to be operable, the only requirement being that they be capable of forming quaternary ammonium chlorides with the higher organic chloride used in the reaction. Amines tested and found satisfactory include primary, secondary and tertiary amines and these have been in the alkyl, aryl or heterocyclic classes. Both saturated and unsaturated, open chain, closed chain and branched chain, and substituted aliphatic amines have been found to perform effectively in the process. As examples of aliphatic amines there may be mentioned triethyl, triethanol, tributyl, dibutyl, monobutyl amines; of aromatic amines there may be mentioned aniline and alkyl substituted anilines; of heterocyclic ring nitrogen compounds there may be mentioned pyridine, and quinoline. In place of these amines quaternary ammonium chlorides derived therefrom may be employed. When primary or secondary amines are used they perform in the same manner as tertiary amines, for in the reaction mass they react with the alkyl chloride present to give quaternary ammonium salts containing 4 organic radicals.

The reaction of the present invention is in some instances improved by the incorporation of other types of materials which act as promoters. Formamide and finely divided solid potassium iodide are two materials that have shown activity of this type.

The processes of the present invention are exemplified by the following:

Example 1

One gram mole of mixed methyl potassium phosphates and 400 ml. of benzyl chloride were heated together with 5 ml. of dibutyl amine and 40 gs. of soda ash to 150° C. in a vessel provided with a stirrer and reflux condenser. Within a short period methyl chloride gas was liberated at a rapid rate. The heating was continued for a period of three hours until practically no more methyl chloride was evolved. Thereupon the reaction mixture was cooled and washed with water to remove soluble salts.

The tribenzyl phosphate produced was then purified by mixing the organic layer with a small amount of soda ash and then subjecting the same to distillation under reduced pressure. The distillation removed the incompletely reacted or intermediate product, methyl benzyl phosphate. The residue of the distillation was then cooled to about 80° C. and filtered thereby recovering 275 grams of tribenzyl phosphate in the form of a clear yellow liquid which set to a cream colored solid melting at 60° C. This product was then further purified by recrystallization from isopropanol and as a result a quite pure solid tribenzyl phosphate having a melting point of 64° C. was obtained in about 70% yield.

The intermediate product, that is the benzyl methyl phosphate, obtained in the above reaction, which boiled at 150–210° C. under 5 mm. pressure, was heated under reflux for four hours with additional quantities of benzyl chloride, tributyl amine and soda ash at a temperature of 160° C. From this reaction mixture there was recovered a tribenzyl phosphate product melting at 64° C., the total yield being about 90% of theory.

Example 2

One-third mole (47 gs.) of trimethyl phosphate was heated to 120° C. with a 50% molar excess of benzyl chloride in the presence of 5 gs. of benzyl trimethyl ammonium chloride and 15 gs. of soda ash. A rapid reaction occurred in which methyl chloride was evolved at a rate exceeding 800 ml. of gas per minute. A kinetic study showed the reaction to be of second order with a rate constant of $1.67 \times 10^{-4}$ at 120° C. After the heating had been continued for a period of about 3 hours, the volatile material was distilled off and a yield of tribenzyl phosphate amounting to 87% was obtained.

Example 3

One-third mole of trimethyl phosphate was heated to 150° C. with a 50% molar excess of primary n-octyl chloride in the presence of 5 gs. of benzyl trimethyl ammonium chloride and 15 gs. of soda ash. After 3 hours heating, the reaction mixture was distilled under reduced pressure to give a 66% yield of tri-n-octyl phosphate boiling at 220–230° C. $_5$ mm. and having a density of 0.910 at 20° C.

Example 4

In a procedure following Example 3, secondary octyl chloride (capryl chloride) was employed instead of the primary octyl chloride. The reaction proceeded at a somewhat slower rate, and after 8 hours at 150° C. the product was distilled under reduced pressure to give a 50% yield of tri-(2-octyl) phosphate boiling at 175–185° C. $_1$ mm. and having a density of 0.920 at 30° C.

Example 5

Following the procedure of Example 3, a chlorinated kerosene (keryl chloride) was employed instead of octyl chloride. The reaction proceeded at a rate intermediate between those of n-octyl and secondary octyl chlorides. After removal of volatile materials, the product, trikeryl phosphate, was recovered as a neutral, nondistillable oil.

Example 6

Dimethyl oxalate in a quantity of 35 gs. was mixed with a molar excess of benzyl chloride, with 5 gs. of tributyl amine and with a few gs. of soda ash. Heat was applied to the mixture and a slow reaction commenced at 120° C. The reaction increased to a maximum rate of over 500 ml. methyl chloride gas per minute when 150° C. was reached. After 2 hours of reaction, excess benzyl chloride and other volatile constituents were removed by distillation and from the residue dibenzyl oxalate was obtained. Upon recrystallization from isopropyl ether 40 gs. of the dibenzyl oxalate were obtained in the form of soft plates melting at 78° C.

Example 7

Forty-seven gs. of trimethyl phosphate, 225 gs. of 1,3-dichloropropene, 5 gs. of tributyl amine and 10 gs. of soda ash were heated together under reflux. After a brief induction period, a smooth, rapid evolution of methyl chloride was observed which gradually diminished in rate as the reaction neared completion within 3 hours at 115° C. The reaction product was distilled under 3 mm. pressure and there was recovered 108 gs. of tri-(3-chloro-2-propenyl) phosphate boiling at 160°–170° C., $d_4^{23} 1.350$. The yield was 75% and the analyses indicated 31% Cl (theoretical content 32.8%).

Example 8

Forty-seven gs. of trimethyl phosphate, 250 gs. of 1,3-dichlorobutene-2 and a small amount of tributyl amine together with soda ash were heated under reflux at a temperature of 120° C. After about three hours the reaction was substantially complete. A 75% yield of tri-(3-chloro-2-butenyl) phosphate was obtained as an amber liquid that could not be distilled without decomposition. Its density at 20° C. was 1.25; its viscosity at the same temperature was 11.2 centipoises and on chlorine analyses it showed 30% (theoretical content 29%).

Example 9

Freshly distilled dimethyl sulphate was mixed with benzyl chloride, a small amount of tributyl amine and anhydrous soda ash. The mass was then heated to 120° C. for a period of 2 hours during which rapid evolution of methyl chloride occurred. The product obtained was an impure dibenzyl sulphate which could not be distilled without decomposition.

In the operation of each of the foregoing examples the methyl chloride gas evolved from the top of the reflux condenser was led into a trap and cooled with Dry Ice wherein the gas condensed as a clear liquid. As a by-product, this chloride is of considerable value to the overall economy of the process.

The new compounds as well as the already known compounds are suitable for use in the production of a number of industrial products including coatings, and plastic films and masses.

It should be understood that the present invention is not limited to the specific compounds, details of reaction or procedures herein described, but that it extends to all equivalents which will occur to those skilled in the art.

I claim:

1. The method which comprises reacting an aliphatic halide compound having more than one carbon atom, at a temperature above 100° C., with a methyl ester of an acid having an ionization constant of more than $1.0 \times 10^{-4}$ in the presence of an amine, liberating methyl halide as a by-product, thereby producing an ester of the acid component with the organic component of the aliphatic halide compound.

2. The method which comprises reacting an aliphatic chloride compound having more than one carbon atom, at a temperature above 100° C., with a methyl ester of an acid having an ionization constant of more than $1.0 \times 10^{-4}$ in the presence of an amine, liberating methyl chloride as a by-product, thereby producing an ester of the acid component with the organic component of the aliphatic chloride compound.

3. The method of producing simultaneously organic esters of relatively strong acids and methyl halides which comprises, mixing together an aliphatic halide compound containing more than one carbon atom, an ester of an oxygen-containing acid having an ionization constant of more than $1.0 \times 10^{-4}$ and having at least one methyl group, and an amine, and raising the temperature of and heating the mixture above 100° C. until methyl halide is liberated in gaseous form and re-esterification occurs by combination of the said acid component with the organic component of the halide.

4. A method for replacing methyl groups of methyl esters of relatively strong acids with alkyl groups having more than one carbon atom which comprises heating an alkyl halide having more than one carbon atom at a temperature above 100° C. with a methyl ester of an oxygen-containing acid having an ionization constant of more than $1.0 \times 10^{-4}$ in the presence of an amine catalyst until a methyl halide is liberated and an ester of the acid is obtained containing the said alkyl group.

5. The method which comprises reacting a chloride of an aliphatic hydrocarbon having more than one carbon atom at a temperature above 100° C. with a methyl ester of an acid having an ionization constant of more than $1.0 \times 10^{-4}$ in the presence of an amine thereby forming an aliphatic hydrocarbon ester of said acid and methyl chloride, and separating the methyl chloride from the said ester.

6. A method which comprises heating and reacting an aliphatic chloride compound containing more than one carbon atom at a temperature above 100° C. with a methyl ester of an oxygen-containing acid having an ionization constant of more than $1.0 \times 10^{-4}$ in the presence of an amine and during said reaction maintaining a neutral to alkaline medium by means of a base included in the reaction mixture and terminating the heating when methyl chloride has been liberated and an ester of the acid component with the organic component of the aliphatic chloride compound has been obtained.

7. A method which comprises heating an aliphatic chloride compound containing more than one carbon atom with a methyl ester of phosphoric acid in the presence of an amine at a temperature above 100° C. until methyl chloride is liberated and an ester of phosphoric acid with the organic component of the aliphatic chloride compound is obtained.

8. A method which comprises heating an aliphatic chloride compound containing more than one carbon atom with a methyl ester of an alkali metal acid phosphate in the presence of an amine at a temperature above 100° C. until methyl chloride is liberated and an ester of phosphoric acid with the organic component of the aliphatic chloride compound is obtained.

9. The method which comprises heating an aliphatic chloride compound containing more than one carbon atom with a mixed alkyl ester of phosphoric acid containing at least one methyl group, in the presence of an amine at a temperature above 100° C. until methyl chloride is liberated and an ester of phosphoric acid with the organic component of the aliphatic chloride compound is obtained.

10. The method of producing tribenzyl phosphate which comprises heating benzyl chloride with a methyl ester of phosphoric acid in the presence of an amine at a temperature above 100° C. until methyl chloride is liberated and tri-benzyl phosphate is formed.

11. The method of producing tribenzyl phosphate which comprises heating benzyl chloride with a methyl ester of an alkali metal acid phosphate in the presence of an amine at a temperature above 100° C. until methyl chloride is liberated and tri-benzyl phosphate is obtained.

12. The method of producing tribenzyl phosphate which comprises reacting benzyl chloride with a methyl ester of phosphoric acid in the presence of an amine and a base at a temperature above 100° C., thereby producing tribenzyl phosphate and methyl chloride as a by-product.

13. The method of producing trioctyl phosphate which comprises heating octyl chloride with a methyl ester of phosphoric acid in the presence of an amine to a temperature above 100° C. until methyl chloride is liberated and trioctyl phosphate is obtained.

14. The method of producing trioctyl phosphate which comprises heating octyl chloride with a methyl ester of an alkali metal acid phosphate in the presence of an amine to a temperature above 100° C. until methyl chloride is liberated and trioctyl phosphate is obtained.

15. The method of producing tri-chloro alkenyl phosphates which comprises heating tri-methyl phosphate to a temperature above 100° C. with a dichloroalkene in the presence of an amine until methyl chloride is liberated and a tri-chloro ankenyl phosphate is obtained.

16. The method of producing tri-chlorobutenyl phosphate which comprises reacting trimethyl phosphate with 1,3-dichlorobutene-2 in the presence of an amine at a temperature above 100° C. until methyl chloride is liberated and tri-chlorobutenyl phosphate is obtained.

EDWIN P. PLUEDDEMANN.

REFERENCES CITED

The following references are of record in the file of this patent:

UNITED STATES PATENTS

| Number | Name | Date |
| --- | --- | --- |
| 2,112,258 | Wilder | Mar. 29, 1938 |
| 2,176,416 | Britton et al. | Oct. 17, 1939 |
| 2,211,943 | Wilder | Aug. 20, 1940 |
| 2,249,768 | Kropa | July 22, 1941 |
| 2,296,823 | Pollack et al. | Sept. 22, 1942 |

OTHER REFERENCES

Reid, "Am. Chemical Jour.," vol. 45 (1911), pages 512 to 516.